(12) United States Patent
Ehama et al.

(10) Patent No.: US 7,917,718 B2
(45) Date of Patent: *Mar. 29, 2011

(54) ARRANGEMENTS HAVING SECURITY PROTECTION

(75) Inventors: Masakazu Ehama, Sagamihara (JP); Kazuhiko Tanaka, Fujisawa (JP); Koji Hosogi, Yokohama (JP); Hiroaki Nakata, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/706,285

(22) Filed: Feb. 16, 2010

(65) Prior Publication Data

US 2010/0146234 A1    Jun. 10, 2010

Related U.S. Application Data

(63) Continuation of application No. 12/258,685, filed on Oct. 27, 2008, now Pat. No. 7,664,925, which is a continuation of application No. 11/702,538, filed on Feb. 6, 2007, now Pat. No. 7,444,487, which is a continuation of application No. 10/801,834, filed on Mar. 17, 2004, now Pat. No. 7,177,996.

(30) Foreign Application Priority Data

Mar. 18, 2003   (JP) ................................. 2003-072919

(51) Int. Cl.
G06F 13/00    (2006.01)
(52) U.S. Cl. ....................................... 711/163; 711/206
(58) Field of Classification Search .......................... None
See application file for complete search history.

(56) References Cited

U.S. PATENT DOCUMENTS

| | | |
|---|---|---|
| 6,330,648 B1 | 12/2001 | Wambach et al. |
| 6,397,301 B1 | 5/2002 | Quach et al. |
| 7,043,615 B1 | 5/2006 | Kobayashi et al. |
| 2002/0018384 A1 | 2/2002 | Sumitani et al. |
| 2002/0083275 A1 | 6/2002 | Kawamoto et al. |

FOREIGN PATENT DOCUMENTS

| | | |
|---|---|---|
| JP | 2002-358251 | 12/2002 |
| WO | WO 98/28695 | 7/1998 |
| WO | WO 02/101504 | 12/2002 |

OTHER PUBLICATIONS

Secure Disk Protection, Nikkei Internet Technology, Japan, Nikkei BP Co., Dec. 22, 2001, vol. 54, p. 112 to 115.

*Primary Examiner* — Brian R Peugh

(74) *Attorney, Agent, or Firm* — Antonelli, Terry, Stout & Kraus, LLP.

(57) ABSTRACT

An external bus interface method including: receiving, via an access control unit, an access request conveyed through an external bus, and judging, via an access judging unit connected to the access control unit, whether the access request is to be honored or rejected, wherein upon receiving the access request, the access control unit sends to the access judging unit an access judging check request signal asking whether the requested address falls within one of access-permitted areas registered in the access judging unit, the access judging unit checks whether the requested address falls within one of the access-permitted areas registered in it and returns to the access control unit, an access judging check result signal indicating whether the access request is to be honored or rejected, and if the access judging check result signal indicates that the access request is to be rejected, the access control unit nullifies the access request.

14 Claims, 12 Drawing Sheets

ARRANGEMENTS HAVING SECURITY PROTECTION

CROSS REFERENCE TO RELATED APPLICATION

This is a continuation of U.S. application Ser. No. 12/258,685, filed Oct. 27, 2008 now U.S. Pat. No. 7,664,925, which is a continuation of U.S. application Ser. No. 11/702,538, filed Feb. 6, 2007 (now U.S. Pat. No. 7,444,487), which is a continuation of U.S. application Ser. No. 10/801,834, filed Mar. 17, 2004 (now U.S. Pat. No. 7,177,996). This application relates to and claims priority from Japanese Patent Application No. 2003-072919, filed on Mar. 18, 2003. The entirety of the contents and subject matter of all of the above is incorporated herein by reference.

BACKGROUND OF THE INVENTION

The present invention relates to a microprocessor which is capable of protecting confidential information that it holds from illegitimate access attempts made through an external bus interface.

Laid-open patent specification No. 2001-306400 (corresponding US publication of unexamined application No. U.S. 2002/0018384A1) discloses a scheme by which a security circuit that is situated between a memory and a memory interface control circuit monitors memory access to ensure that it conforms to a prescribed protocol. The security circuit uses a combination of a key address that is assigned to it and its associated protocol to expand the area(s) that can be accessed within the memory space or to determine the area(s) that can be accessed by anticipated access requests and protect the remainder of the memory space from being accessed for data transfer. Under this scheme, when an attempt is made to access an area which is still protected, the validity of the read data is not guaranteed.

In the above-described system, only the external memory space was subject to protection: the processor's internal memory was not. However, expanding this scheme to cover the processor's entire internal memory space would significantly increase the amount of redundant logic circuits, making the processor bulky.

The scheme disclosed in the above-referenced laid-open patent specification lacks flexibility and expandability, since it uses hardware logic to determine whether memory protection applies or not, according to the sequence in which memory addresses are accessed.

Still another problem with such a scheme is that, in a processor not equipped with a protection mechanism, it is easy to read or alter the contents of a register or a local memory inside the processor through an external bus. As a result, confidential data, such as cryptographic keys, can be stolen, or a newly developed piece of software can be copied.

SUMMARY OF THE INVENTION

An object of the present invention is to solve the above-described problems by preventing illegitimate access to a processor through a universal external bus that is connected to it.

A processor according to the present invention is equipped with an access control unit for controlling data transfer between a universal external bus, such as a Peripheral Component Interconnect (PCI) bus, and the processor's internal bus, a Translation Lookaside Buffer (TLB) indicating the ranges of addresses for which access is permitted (hereinafter referred to as access-permitted areas), and a TLB control unit being provided for updating the contents of the TLB.

The TLB control unit updates the contents of the TLB only through access from inside the processor. The contents of the TLB can be accessed from a universal external bus such as a PCI bus through the access control unit. For each access request, the access control unit interrogates the TLB as to whether the requested address is within one of the access-permitted areas, and, depending on the response from the TLB, it determines whether to pass the access request to the internal bus or to reject it. In this manner the confidential information inside the processor is protected.

Other features of the invention will be described in detail in the following specification with reference to the accompanying drawings.

DESCRIPTION OF THE PREFERRED EMBODIMENTS

Details of a preferred embodiment of the present invention are set forth in the following description and the accompanying drawings. Throughout this description, the preferred embodiment and examples shown should be considered as exemplary, rather than as limitations on the invention.

Figure 1:
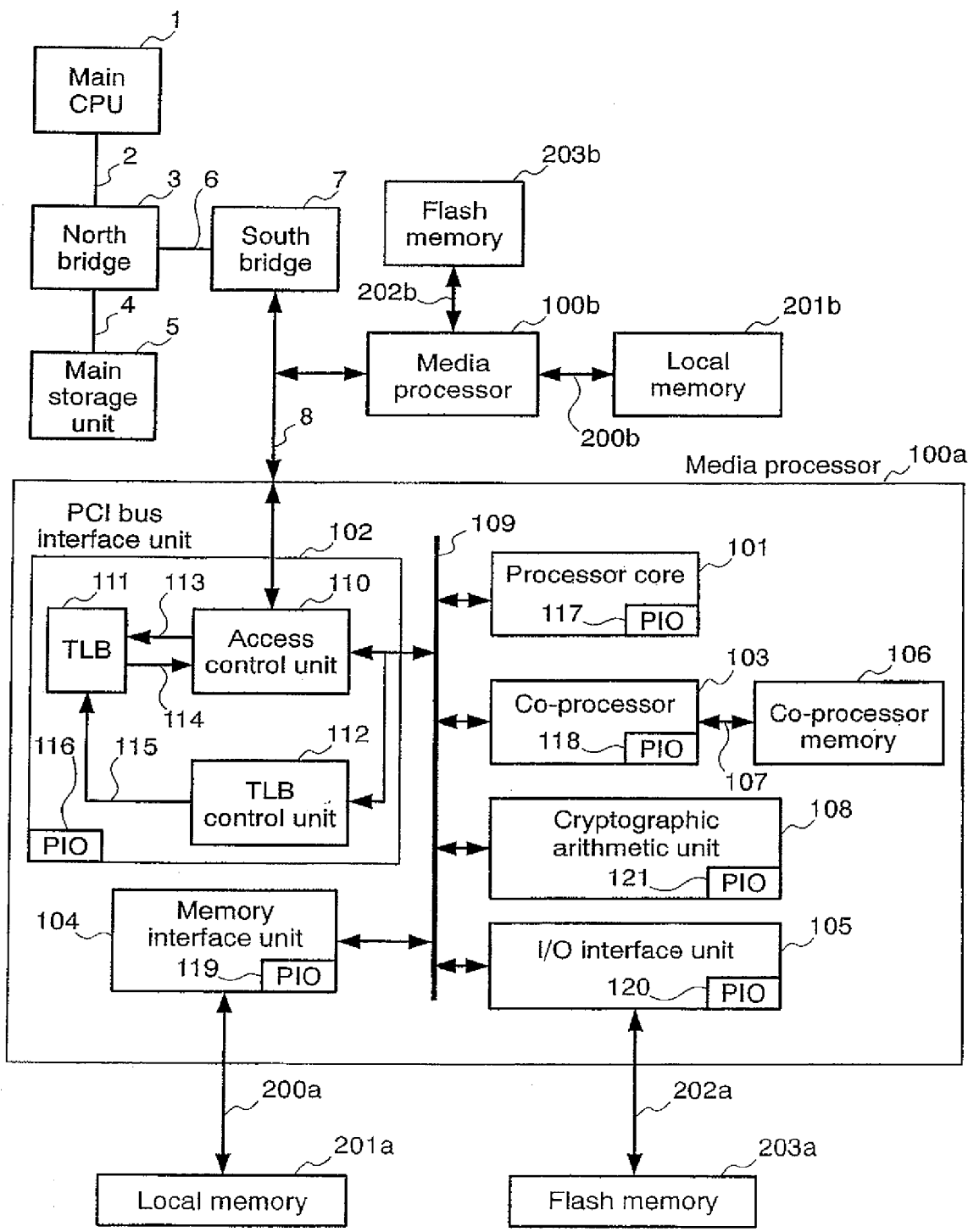
FIG. 1 is a block diagram which shows a configuration in which a media processor equipped with a preferred embodiment of the present invention is connected to a PCI bus.

FIG. 1 shows an example of the configuration of a computer system to which the preferred embodiment of the present invention is applied. For simplicity, parts that are not directly related to the invention are not indicated.

A main CPU 1 is connected to a north bridge 3 equipped with a high-speed bus interface through a processor bus 2. The north bridge 3 is connected to a main storage unit 5, through a memory bus 4, and also to a south bridge 7, that is equipped with a low-speed bus interface, through an inter-bridge connection bus 6.

The south bridge 7 is connected to a PCI bus 8 to which two media processors 100a and 100b are also connected. The media processors 100a and 100b are connected to local memories 201a and 201b through local memory buses 200a and 200b, respectively, and also to flash memories 203a and 203b through flash memory buses 202a and 202b, respectively. Although the description herein assumes that each of the media processors 100a and 100b and its associated local memory 201a/201b and flash memory 203a/203b are configured together in a single chip, they can also consist of more than one chip.

The media processor 100a comprises a processor core 101 that performs computation, a PCI bus interface unit 102 that controls connection to the PCI bus 8, a co-processor 103 that performs computation supplementary to that of the processor core 101, a memory interface unit 104 that controls access to the local memory 201a, an I/O interface unit 105 that controls the I/O interface, a cryptographic arithmetic unit 108 that performs encryption and decryption, and an internal bus 109 that interconnects these units. Examples of the encryption/decryption algorithm include Multi2 and DES. Further, a co-processor memory 106 is connected to the co-processor 103 through a co-processor memory bus 107.

Further, the PCI bus interface unit 102 is equipped with a PCI bus interface PIO register 116 for controlling the bus operation; the processor core 101 is equipped with a processor core PIO register 117; the co-processor 103 is equipped with a co-processor PIO register 118; the memory interface unit 104 is equipped with a memory interface PIO register 119; the I/O interface unit 105 is equipped with an I/O interface PIO register 120; and the cryptographic arithmetic unit 108 is equipped with a cryptographic arithmetic unit PIO register 121.

When the media processor 100a is booted, the I/O interface unit 105 loads a program from the flash memory 203a to the processor core 101. When the processor core 101 executes the loaded program, it issues a TLB update request through the internal bus 109 to a TLB control unit 112 located inside the PCI bus interface unit 102. Upon receiving this request, the TLB control unit 112 updates the contents of the TLB 111 by sending a TLB update signal 115 to it, to designate as accessible only certain areas of the media processor's internal logic, the local memory 201a and the flash memory 203a, the entire areas of which are initially accessible at the time of booting.

When the main CPU 1 issues a read request to the media processor 100a, it is sent through the north bridge 3, the south bridge 7, and the PCI bus 8 to the PCI bus interface unit 102. Inside the PCI bus interface unit 102, the access control unit 110, upon receiving the read request, interrogates the TLB 111 by sending a TLB check request signal 113 to it to determine whether the requested address is within one of the access-permitted areas. The TLB 111 compares the requested address with the ranges of addresses registered in it and notifies the access control unit 110 of the result by sending a TLB check result signal 114 to it. If the result is positive, indicating that the read request is to be honored, the access control unit 110 issues a request to the internal bus 109, obtains the desired data, and sends it to the main CPU 1 through the PCI bus 8, the south bridge 7, and the north bridge 3. If the result is negative, indicating that the read request is to be rejected, the access control unit 110 sends meaningless data to the main CPU 1.

When the main CPU 1 issues a write request to the media processor 100a, it is sent to the PCI bus interface unit 102 through the same route as used for a read request. Inside the PCI bus interface unit 102, the access control unit 110, upon receiving the write request, interrogates the TLB 111 by sending a TLB check request signal 113 to it, to determine whether the requested address is within one of the access-permitted areas. The TLB 111 compares the requested address with the ranges of addresses registered in it and notifies the access control unit 110 of the result by sending a TLB check result signal 114 to it. If the result is positive, indicating that the write request is to be honored, the access control unit 110 issues a request to the internal bus 109 to effect the write action. If the result is negative, indicating that the access request is to be rejected, the access control unit 110 nullifies the write request.

Read and write requests originating in the media processor 100b, which is another PCI device, are handled in the same manner as those originating in the main CPU 1.

The contents of the TLB 111 can be updated only by the processor core 101: They cannot be updated by the main CPU 1 or any other PCI device.

Figure 2:
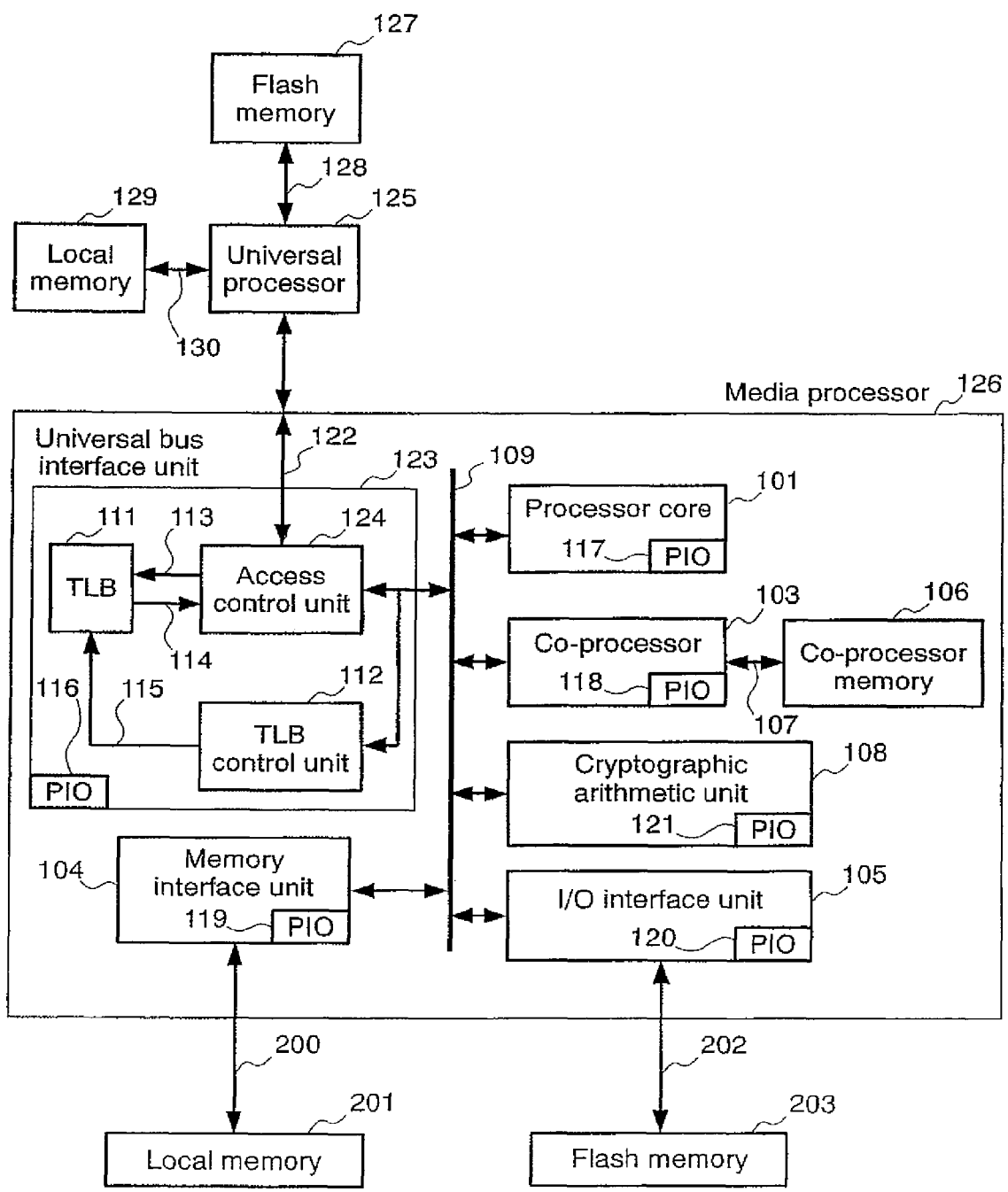
FIG. 2 is a block diagram which shows a configuration in which a media processor equipped with a preferred embodiment of the present invention is connected to a universal bus.

FIG. 2 shows the configuration of a media processor 126 equipped with a universal bus interface unit 123. A bus interface composed of an address bus, a data bus, and a set of control signals, such as a request, is referred to as a universal bus interface. By specifying a read request as the control signal, while putting the requested address on the address bus, data is obtained on the data bus. By specifying a write request as the control signal, while putting the requested address on the address bus and the write data on the data bus, the data at the requested address is updated.

The media processor 126 comprises a processor core 101, a co-processor 103, a memory interface unit 104, an I/O interface unit 105, a cryptographic arithmetic unit 108, a universal bus interface unit 123, and an internal bus 109 that interconnects these units. Further, a co-processor memory 106 is connected to the co-processor 103 through a co-processor memory bus 107; a local memory 201 is connected to the memory interface unit 104 through a local memory bus 200; and a flash memory 203 is connected to the I/O interface unit 105 through a flash memory bus 202.

Further, the universal bus interface unit 123 is equipped with a universal bus interface PIO register 116 for controlling the bus operation; the processor core 101 is equipped with a processor core PIO register 117; the co-processor 103 is equipped with a co-processor PIO register 118; the memory interface unit 104 is equipped with a memory interface PIO register 119; the I/O interface unit 105 is equipped with an I/O interface PIO register 120; and the cryptographic arithmetic unit 108 is equipped with a cryptographic arithmetic unit PIO register 121.

When the media processor 126 is booted, the I/O interface unit 105 loads a program from the flash memory 203 to the processor core 101 through the internal bus 109. When the processor core 101 executes the loaded program, it issues a TLB update request through the internal bus 109 to a TLB control unit 112. Upon receiving this request, the TLB control unit 112 updates the contents of the TLB 111 located inside the universal bus interface unit 123 by sending a TLB update signal to it, to designate as accessible only certain areas of the media processor's internal logic, the local memory 201 and the flash memory 203, the entire areas of which are initially accessible at the time of booting.

The media processor 126 is connected to a universal processor 125 through a universal bus 122. The universal processor 125 is connected to a flash memory 127 for the universal processor through a bus 128, and it is also connected to a local memory 129 for the universal processor through a bus 130. When the universal processor 125 issues a read request to the media processor 126, an access control unit 124 interrogates the TLB 111 by sending a TLB check request signal 113 to it to determine whether the requested address is within one of the access-permitted areas. The TLB 111 compares the requested address with the ranges of addresses registered in it and notifies the access control unit 124 of the result by sending a TLB check result signal 114 to it. If the result is positive, indicating that the read request is to be honored, the access control unit 124 issues a request to the internal bus 109, obtains the desired data and sends it to the universal processor 125 through the universal bus 122.

When the universal processor 125 issues a write request to the media processor 126, the access control unit 124 checks, in the same manner as used for a read request, whether the requested address is within one of the access-permitted areas. If the result is positive, indicating that the write request is to be honored, the access control unit 124 issues a request to the internal bus 109 to effect the write action. If the result is negative, indicating that the write request is to be rejected, the access control unit 124 nullifies it.

The contents of the TLB 111 can be updated only by the processor core 101: They cannot be updated by the universal processor 125.

Figure 3:
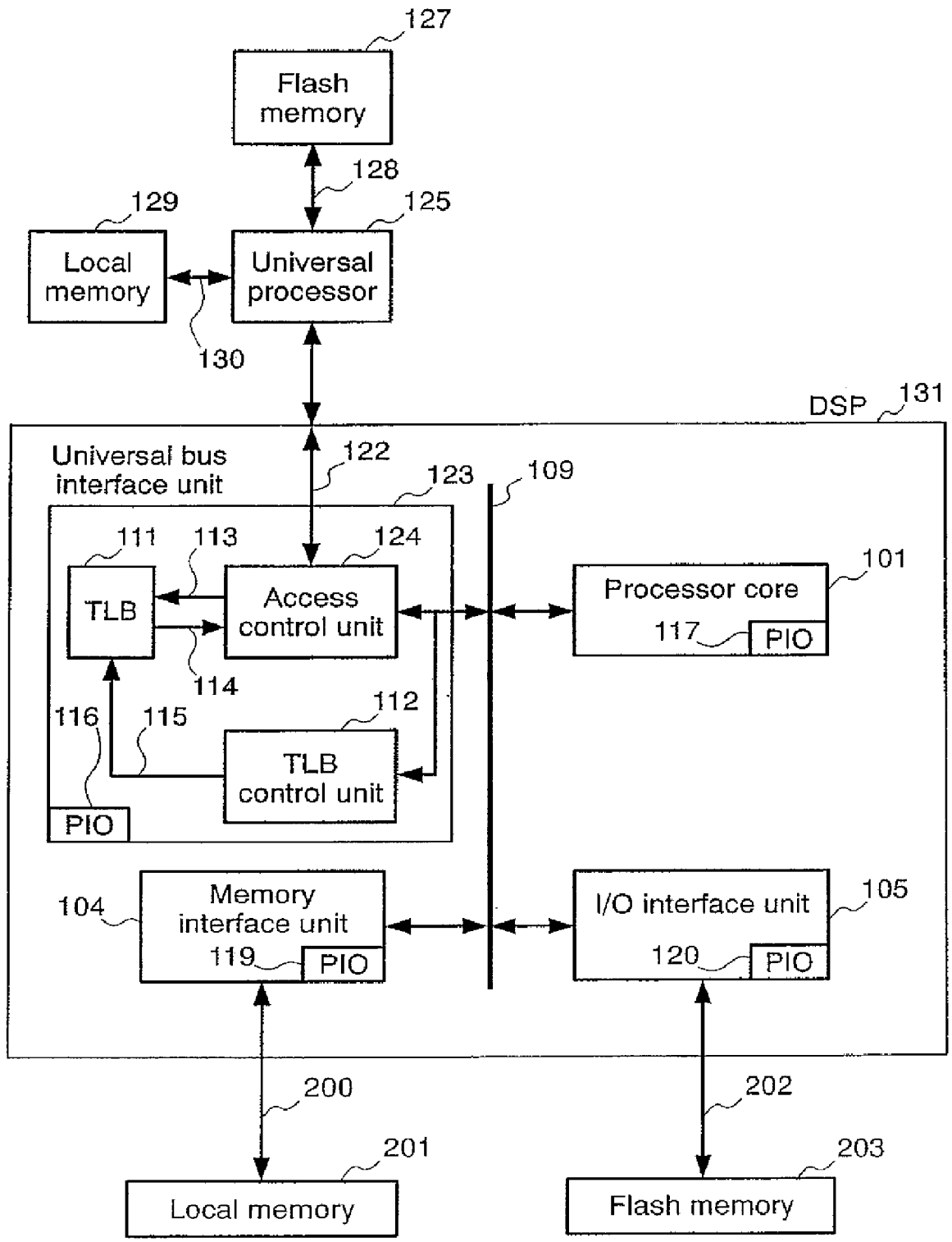
FIG. 3 is a block diagram which shows a configuration in which a digital signal processor (DSP) that is equipped with a preferred embodiment of the present invention is connected to a universal bus.

FIG. 3 shows the configuration of a digital signal processor (hereinafter abbreviated to DSP) 131 to which the invention is applied. The DSP 131 comprises a processor core 101 that performs computation, a memory interface unit 104, an I/O interface unit 105, a universal bus interface unit 123, and an internal bus 109 that connects these units. A local memory 201 is connected to the memory interface unit 104 through a local memory bus 200; and a flash memory 203 is connected to the I/O interface unit 105 through a flash memory bus 202.

Further, the universal bus interface unit 123 is equipped with a universal bus interface PIO register 116 for controlling the bus operation; the processor core 101 is equipped with a processor core PIO register 117; the memory interface unit 104 is equipped with a memory interface PIO register 119; and the I/O interface unit 105 is equipped with an I/O interface PIO register 120.

The DSP 131 is connected to a universal processor 125 through a universal bus 122. The universal processor 125 is connected to a flash memory 127 for the universal processor through a bus 128, and it is also connected to a local memory 129 for the universal processor through a bus 130. The universal processor 125 is usually capable of accessing everything inside the DSP 131. When the universal processor 125 issues an access request to the DSP 131, the DSP 131 loads a program from the flash memory 127 for the universal processor and also performs initialization of itself. At the completion of initialization, the DSP 131 reads data out of the flash memory 203 through the I/O interface unit 105 and, by feeding the read data through the internal bus 109 to the universal bus interface unit 123, sets up the TLB 111 located inside it. The TLB control unit 112, upon receiving a TLB write request from the processor core 101, updates the contents of the TLB 111 by issuing a TLB update signal 115 to it, to designate as accessible only certain areas of the DSP's internal logic, the local memory 201 and the flash memory 203, the entire areas of which are initially accessible at the time of initialization.

When the DSP 131 receives a read request from the universal processor 125, the access control unit 124 interrogates the TLB 111 by sending a TLB check request signal 113 to it to determine whether the requested address is within one of the access-permitted areas. The TLB 111 compares the requested address with the ranges of addresses registered in it and notifies the access control unit 124 of the result by sending a TLB check result signal 114 to it. If the result is positive, indicating that the read request is to be honored, the access control unit 124 issues a request to the internal bus 109, obtains the desired data, and sends it to the universal processor 125 through the universal bus 122.

When the universal processor 125 issues a write request to the DSP 131, the access control unit 124, in the same manner as used for a read request, checks to determine whether the requested address is within one of the access-permitted areas. If the result is positive, indicating that the write request is to be honored, the access control unit 124 issues a request to the internal bus 109 to effect the write action. If the result is negative, indicating that the write request is to be rejected, the access control unit 124 nullifies it.

Figure 4:
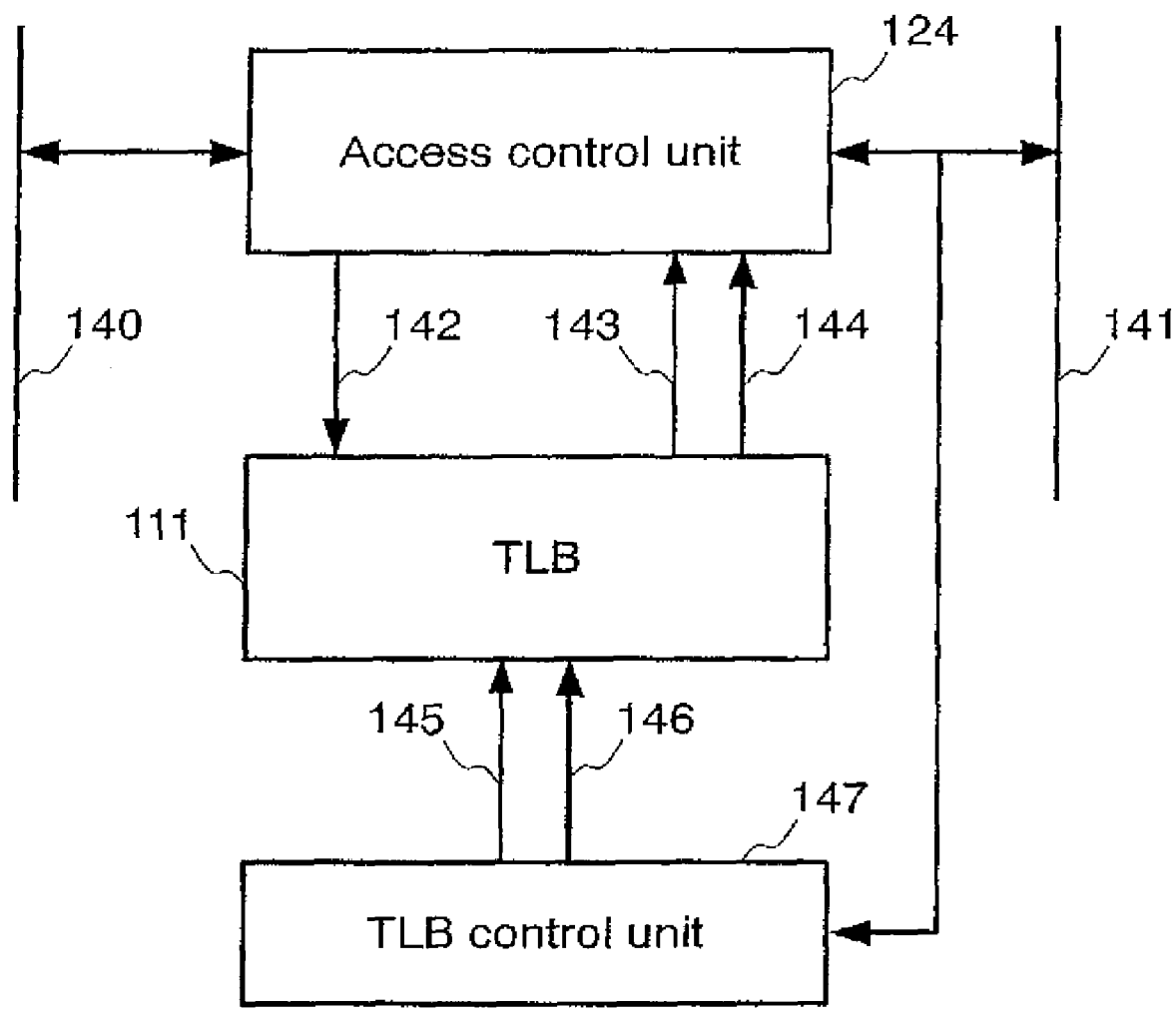
FIG. 4 is a block diagram which shows a configuration in which an external bus is connected to an internal bus using the TLB.

FIG. 4 shows the configuration of a bus interface unit for connecting an external bus 140 and an internal bus 141 to which the invention is applied.

An access control unit 124 is connected to the external bus 140 and the internal bus 141 and carries out data transfer between the two buses. The access control unit 124, whenever it receives an access request, interrogates the TLB 111 using a correlation address 142 to determine whether the requested address is within one of the access-permitted areas. The TLB 111 determines whether the access request is to be honored, and it notifies the access control unit 124 of the result by sending to it a TLB check result signal 143 together with an address 144 resulting from the translation performed by the TLB 111. If the result is positive, the access control unit 124 issues an access request to the internal bus 141. The contents of the TLB 111 can be updated only through the internal bus 141. When a TLB update request arrives through the internal bus 141, a TLB control unit 147 receives it and sends a TLB update signal 145 to the TLB 111 together with an entry address 146 that indicates which entry of the TLB is to be updated. The contents of the TLB 111 are then updated based on the address sent through the internal bus 141; the new parameters for access control then take effect.

Each TLB update request is issued by the processor core 101 and is sent to both the access control unit 124 and the TLB control unit 147. The address placed on the internal bus 141 determines which of the two units the request is directed to.

Figure 5:
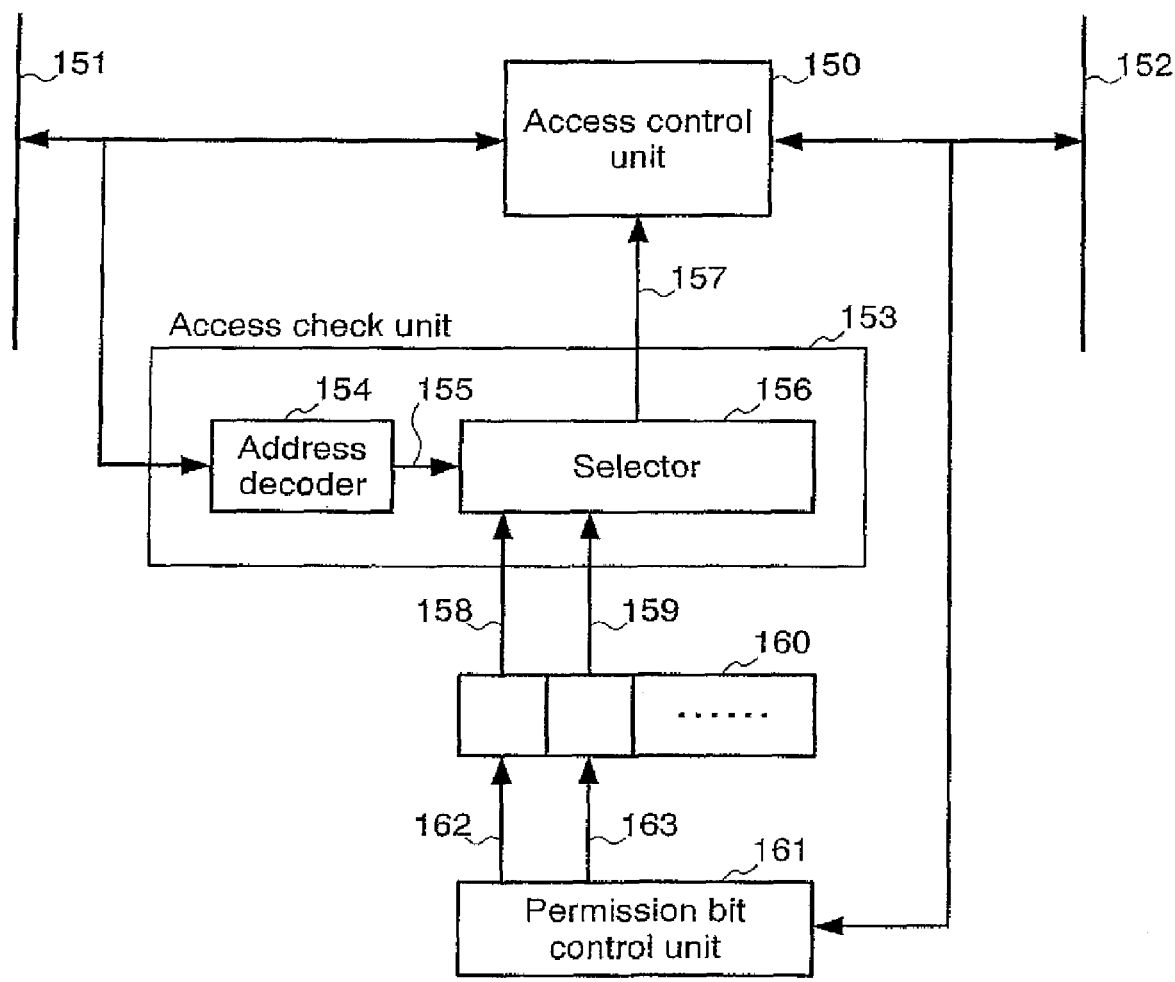
FIG. 5 shows a configuration in which an external bus is connected to an internal bus under the control of a set of access control bits.

FIG. 5 shows still another example of an embodiment of the invention as applied to a bus interface unit. An access control unit 150 is connected to an external bus 151 and an internal bus 152 and carries out data transfer between them. A permission bit control unit 161 accepts requests coming from the processor core or any other unit connected to the internal bus 152 at any time. Such requests are issued whenever there is a need to update the conditions for controlling access requests coming through the external bus 151.

When a read or write request arrives through the external bus 151, the requested address is sent to the access control unit 150 and to an address decoder 154 located in an access check unit 153. The address decoder 154 generates an area selection signal 155 out of the requested address and sends it to a selector 156. The area selection signal 155 is used to select one of the permission bit signals 158, 159, and so forth, which constitute the output of a permission bit register 160 and which are sent to the selector 156 all of the time. The result of the selection is sent to the access control unit 150 through an access check signal 157. Upon receiving the access check signal 157, the access control unit 150 determines whether or not to reject the read or write request, and if the requested address is within one of the access-permitted areas, it issues a corresponding read or write request to the internal bus 152.

The contents of the permission bit register 160 can be updated only through the internal bus 152; they cannot be updated through the external bus 151. Upon receiving an alteration request through the internal bus 152, the access control unit 150 passes it to the permission bit control unit 161, which in turn updates the contents of the permission bit register 160 with the alteration permission signals 162, 163, and so forth.

Figure 6:
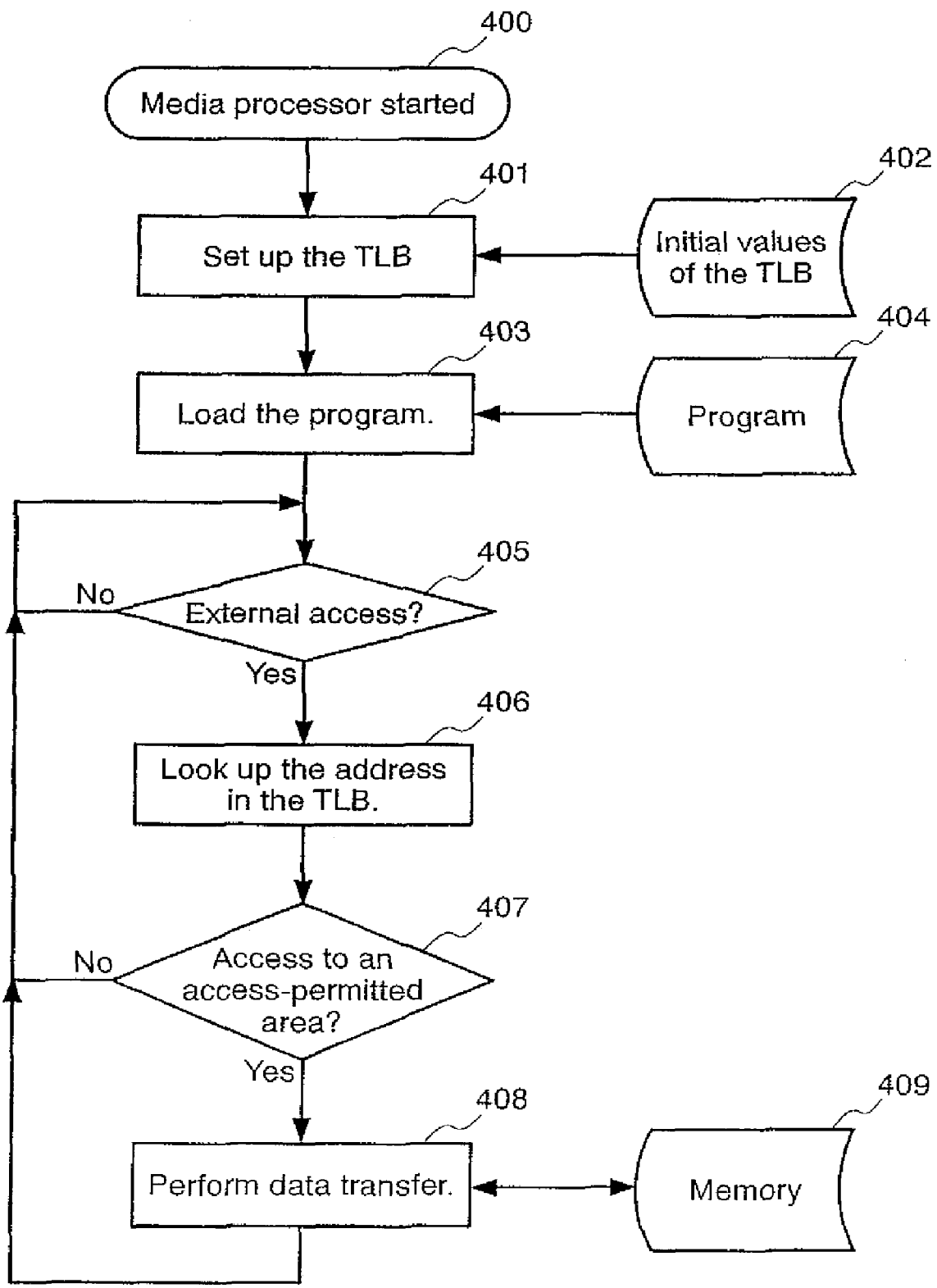
FIG. 6 is a flowchart showing the process of access control.

FIG. 6 is a flowchart of the processing used for access control. When the media processor is started (400), it sets up the contents of the TLB (401) using the initial values of the TLB 402 that are stored in a non-volatile memory, such as a flash memory. It then loads into its local memory a program 404 that is stored in the same or another non-volatile memory (403).

While running the program thus loaded, the media processor checks to determine whether an access request has arrived from outside (405). If no access request has arrived from outside, it continues program execution. If an access request has indeed arrived, it looks up the address specified by the access request in the TLB (406). If the table look-up shows that the requested address is not within one of the access-permitted areas (407), the media processor rejects the access request and waits for the arrival of another access request from outside, while continuing program execution. If the table look-up shows that the requested address is within the access-permitted area (407), the media processor performs the requested data transfer (408), that is, in the case of a read request, it reads data out of a memory 409, or in the case of a write request, it writes data into the memory 409. The memory 409 can be the local memory, the internal memory, or one of the internal registers of the media processor.

Figure 7:
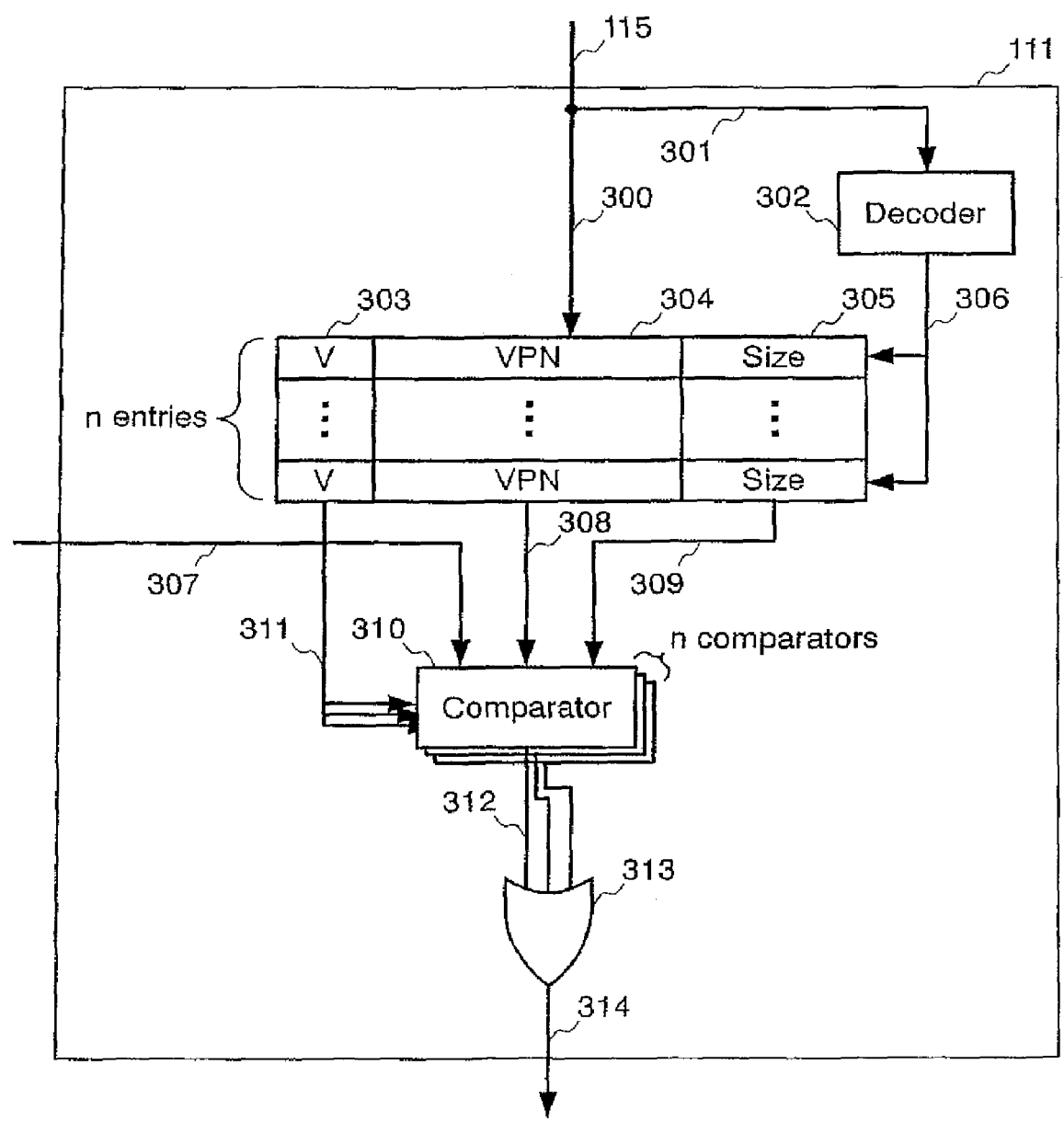
FIG. 7 is a schematic diagram which illustrates the internal structure of the TLB.

FIG. 7 illustrates an example of the internal structure of the TLB 111. The TLB update signal 115 arrives at the TLB 111. The TLB update signal 115 comprises TLB entry data 300 and a TLB address 301. The TLB address 301 is sent to a decoder 302, which determines the entry of the TLB 111 to be updated. The contents of the designated TLB entry, namely a validity bit 303, a virtual page number 304, and an access size 305, are then updated with the TLB entry data 300.

A comparator 310 compares an access address 307 pertaining to an access request received from the outside with the contents of its corresponding entry of the TLB 111. The validity bit 303 is fed to the comparator 310 as a validity signal 311, so that only the contents of valid entries participate in the comparison. The virtual page number 304 of each valid entry points to the starting location of an access-permitted area, and the access size 305 plus the virtual page number 304 points to the last location of that access-permitted area. The virtual page number 304 and the access size 305 are fed into the comparator as a virtual page number signal 308 and an access size signal 309, respectively, which are then used to determine whether the requested address is within the access-permitted area registered in this TLB entry. A result signal 312 carries the result of the comparison for its corresponding TLB entry.

The result signals 312 corresponding to all of the TLB entries are ORed into a TLB check result signal 314 by an OR circuit 313. The TLB check result signal 314 is used to determine whether the requested access request is to be honored or rejected.

Figure 8:
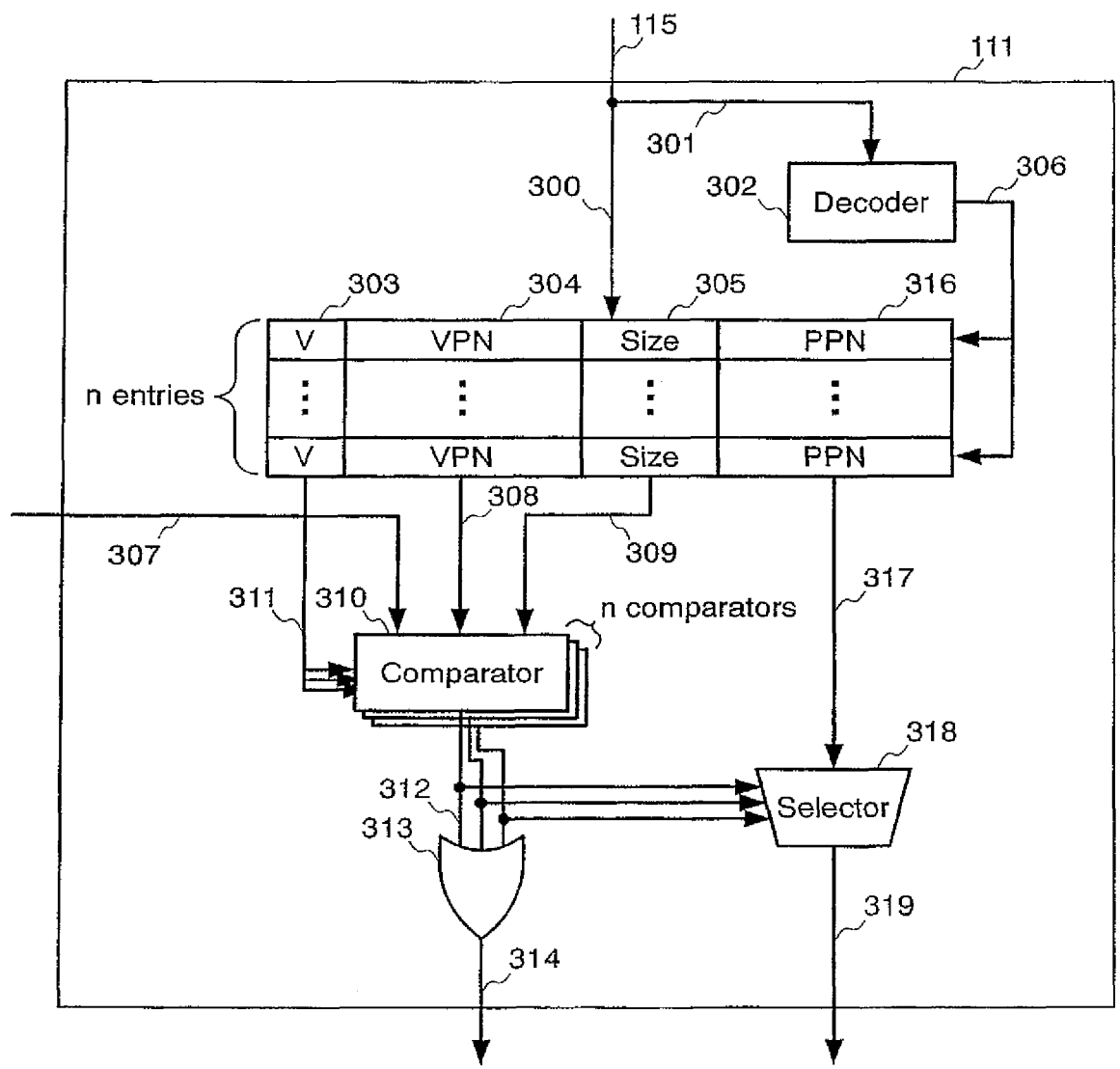
FIG. 8 is a schematic diagram which illustrates the internal structure of the TLB provided with an address translation feature.

FIG. 8 illustrates the internal structure of the TLB when equipped with an address translation feature. The TLB update signal 115 arrives at the TLB 111. The TLB update signal 115 comprises TLB entry data 300 and a TLB address 301. The TLB address 301 is sent to a decoder 302, which determines the entry of the TLB to be updated. The contents of the designated TLB entry, namely a validity bit 303, a virtual page number 304, an access size 305, and a physical page number 316, are then updated with the TLB entry data 300. Although the description here designates these parameters as data items subject to updating, not all of them are required to be always updated together, and alternative implementations can be envisaged.

One such alternative would be to allow the choice of updating or not updating the validity bit. In this alternative implementation, initially the same data is put in the physical page address and access size fields of all of the entries, making the entire area of each physical page accessible.

Still another alternative would be to allow the choice of updating or not updating the physical page number and access size fields. If it is chosen not to update the physical page number and access size fields, it is assumed that a fixed area with a certain length starting at the origin of the physical page area is accessible.

A comparator 310 compares an access address 307 pertaining to an access request received from the outside with the contents of its corresponding entry of the TLB 111. The validity bit 303 is fed to the comparator 310 as a validity signal 311, so that only the contents of valid entries participate in the comparison. The virtual page number 304 of each valid entry points to the starting location of an access-permitted area, and the access size 305 plus the virtual page number 304 points to the last location of that access-permitted area. The virtual page number 304 and the access size 305 are fed into the comparator as a virtual page number signal 308 and an access size signal 309, respectively, which are then used to determine whether the requested address is within the access-permitted area registered in this TLB entry. A result signal 312 carries the result of the comparison for its corresponding TLB entry. The result signal 312 of each TLB entry is fed to an OR circuit 313 and to a selector 318, which selects the physical page number stored in its corresponding TLB entry. The result signals 312 of all of the TLB entries are ORed into an a TLB check result signal 314 by the OR circuit 313. The selector 318 selects one of the n physical page numbers (PPNs) 316 and places it on a post-translation address signal line 319.

This address translation applies to external access requests that come through the external bus, since the specified address on the external bus is not directly usable as an internal address for the processor in which the TLB 111 is situated and, therefore, needs to be translated. The inclusion of the physical page number in the TLB 111 removes the bottleneck typically associated with address translation by quickly mapping the specified address to its corresponding processor-internal address.

Figure 9:
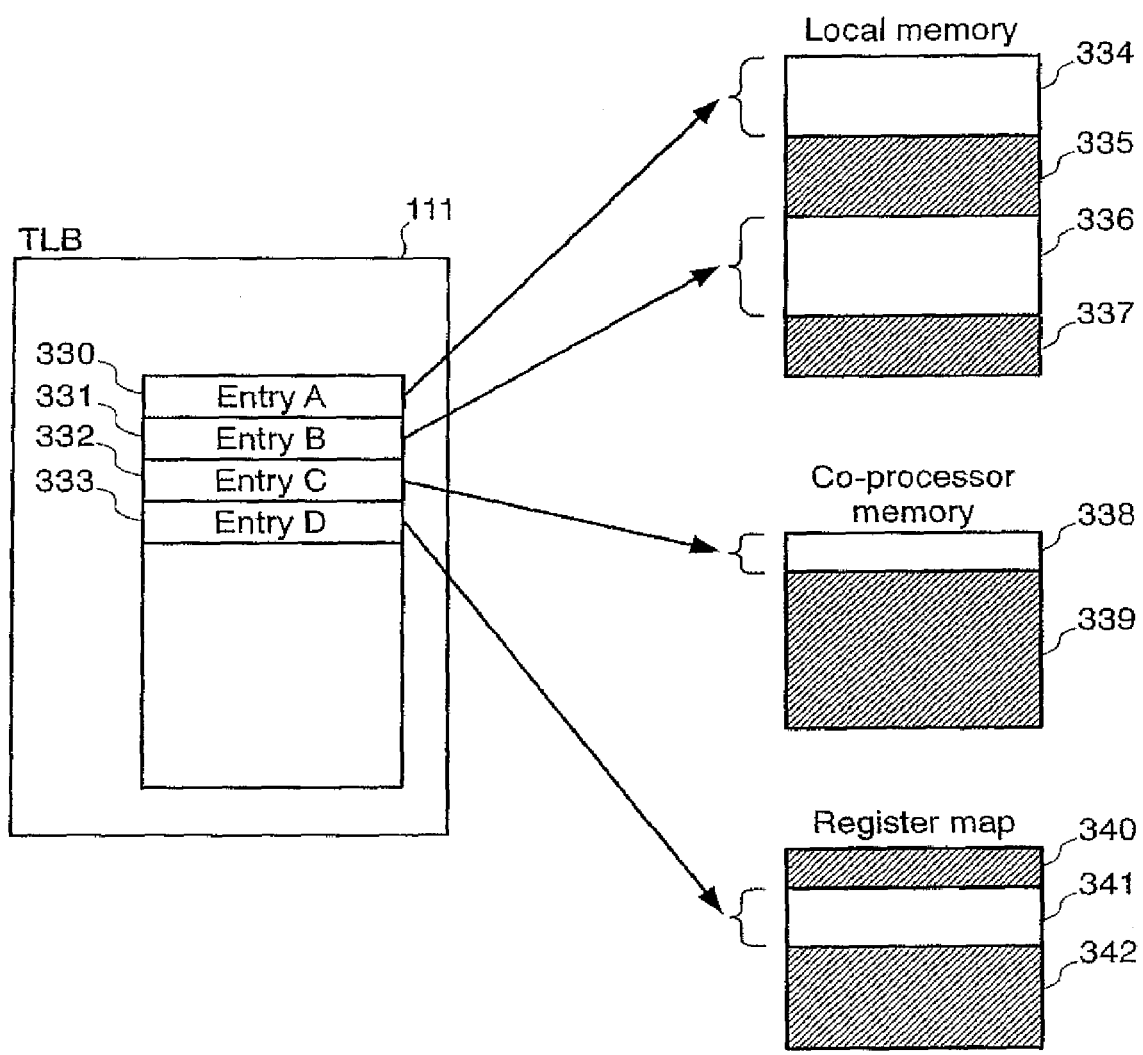
FIG. 9 is a diagram which illustrates the mapping between the contents of the TLB and memory areas and registers.

FIG. 9 illustrates how the TLB 111 specifies access-permitted areas and ranges of addresses for which access is not permitted (hereinafter referred to as access-prohibited areas). Entry A 330 and entry B 331 of the TLB 111 designate an area 334 and another area 336 of the local memory as accessible (access-permitted), respectively. An area 335 and another area 337 of the local memory are not designated by the TLB 111 and, therefore, cannot be accessed from the outside.

Entry C 332 designates an area 338 of the co-processor memory as accessible. An area 339 of the co-processor memory is not designated as accessible by the TLB 111 and, therefore, cannot be accessed from the outside. Similarly, entry D 333 designates an area 341 of the register map as accessible. An area 340 and another area 342 of the register map are not designated as accessible by the TLB 111 and, therefore, cannot be accessed from the outside, i.e., can be neither read nor written into by a request from the outside.

Whereas these access-prohibited areas cannot be accessed from the outside, they can be accessed from inside the processor without limitation.

Figure 10:
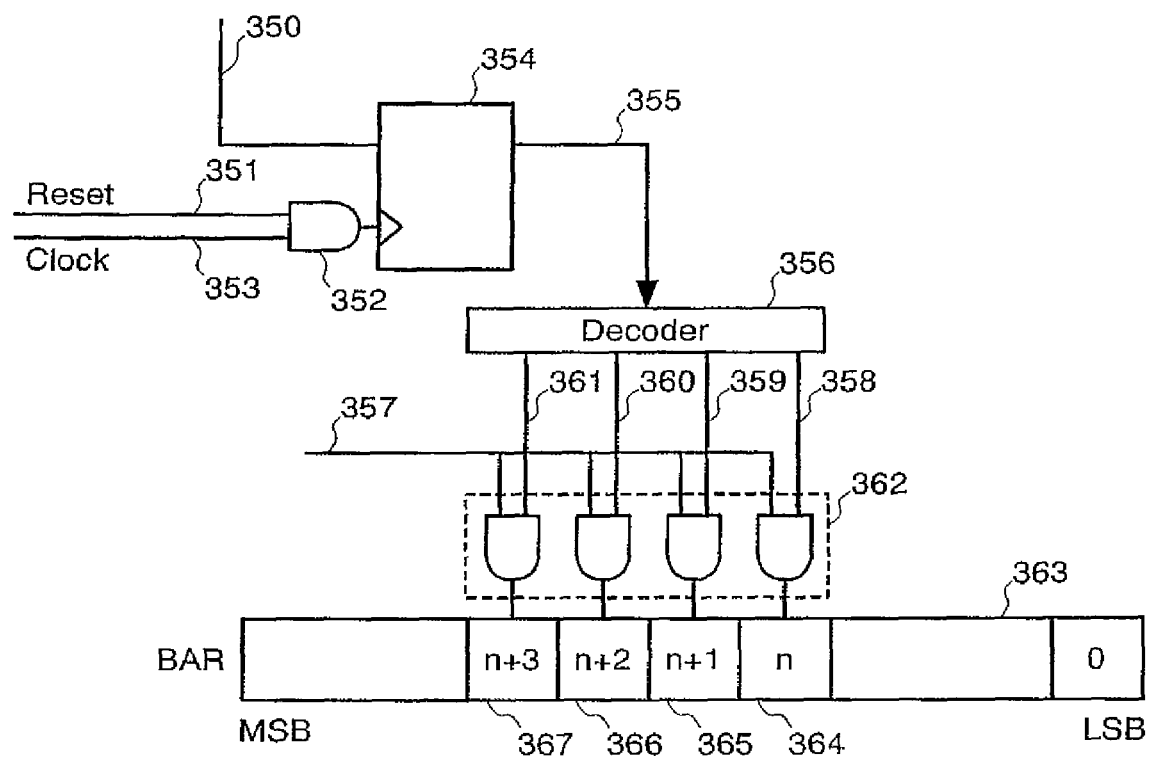
FIG. 10 is a schematic circuit diagram which shows a first configuration for access control using the Base Address Register (BAR).

FIG. 10 illustrates a mechanism for limiting accessible areas in memory space using the base address register (BAR) on a PCI. First, how the BAR on a PCI can be used to limit accessible areas in memory space will be explained.

Figure 11:
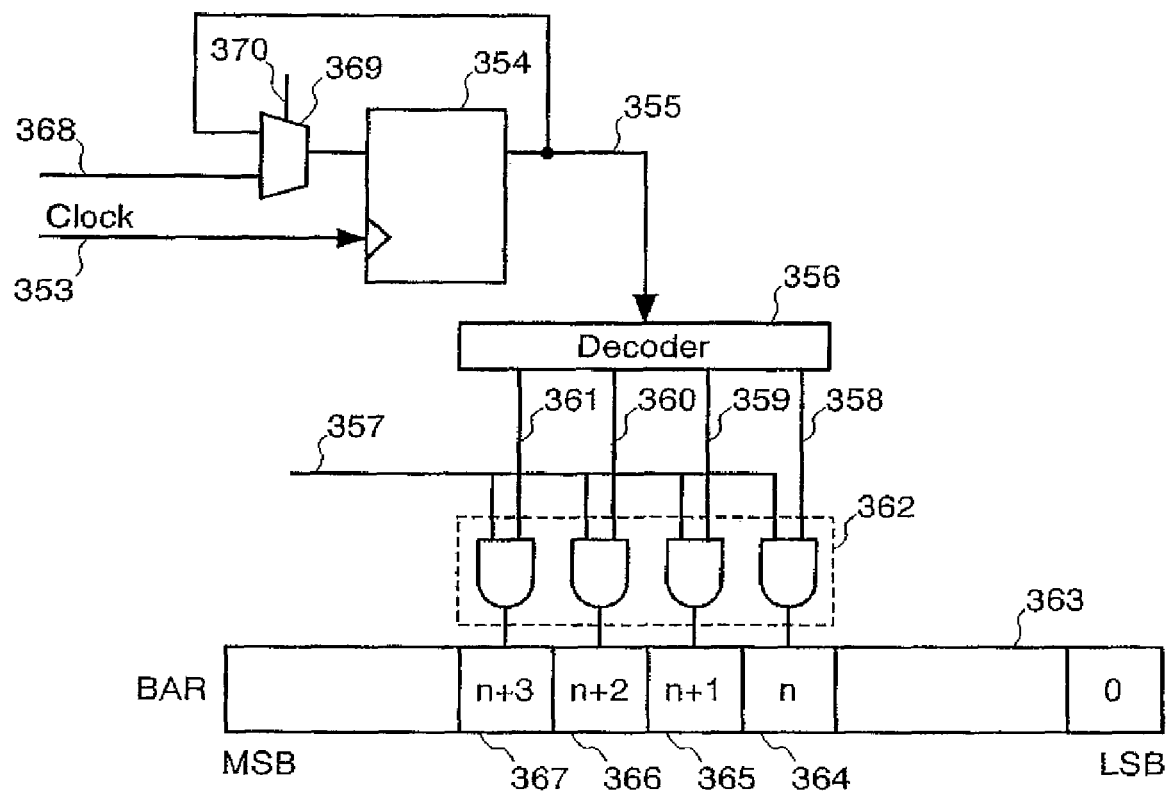
FIG. 11 is a schematic circuit diagram which shows a second configuration for access control using the BAR.

Each PCI device has its own memory space. The size of the memory space differs from device to device. According to the current PCI specifications, a PCI has 4 GB (gigabytes) of memory space, onto which memory spaces of PCI devices are mapped. For example, if a PCI memory space starting at 0×1000 is allocated to a PCI device having a memory space of 0×4000 (hexadecimal) bytes in size, then addresses 0×1000 through 0×4FFF on the PCI bus are mapped onto the memory space of that PCI device, so that the latter can be accessed through this window of addresses on the PCI bus. The BAR is used to set up the memory space for a PCI device. The PCI device can change the size of its own BAR as necessary. For example, ordinarily 128 MB (megabytes) of PCI space is allocated for a PCI device having 128 MB of memory. It is possible, however, by allocating only 64 MB (as illustrated in FIGS. 10 and 11), to hide the remaining 64 MB of the memory space of the PCI device from the PCI bus.

When an access request appears on the PCI bus, each PCI device compares the requested address with the contents of its own BAR, and responds to the access request only if it judges that the access request is directed to itself. The judgment of whether the access request is directed to itself is based on whether the address range of the access request matches its defined memory space. If the BAR is set to be only 64 MB in size, an access request for 65 MB of memory is considered to be not directed to this PCI device.

Next, a specific way of limiting access-permitted areas in memory space using the BAR on a PCI will be described with reference to FIG. 10.

A BAR set signal 350, that comes from outside the processor and specifies an area for the BAR, is input to a data holding register 354 and is stored into it when a reset operation is initiated by power on, software reset, or an external reset button. A reset signal 351 is input to a Logical AND circuit 352 together with a clock signal 353. Assuming positive logic, when the reset signal 351 takes a value of logical "1," the contents of the data holding register 354 are updated at the timing of the clock signal 353. The output 355 of the data holding register 354 is input to a decoder 356, which determines which bits of the BAR are to be updated.

The decoder 356 sends decode result signals 358, 359, 360, and 361 to a group of Logical AND circuits 362, which correspond to the n-th bit 364, n+1-th bit 365, n+2-th bit 366, and n+3-th bit 367 of a BAR 363, respectively. They are ANDed with a BAR change signal 357, and the results are input to the n-th bit 364, n+1-th bit 365, n+2-th bit 366, and n+3-th bit 367 of the BAR 363.

If all of the decode result signals 358, 359, 360, and 361 carry a value of logical "1," all the upper bits including the n-th bit 364 of the BAR can be updated by the BAR change signal 357. The n-th bit represents the smallest area that can be allocated in the PCI space, and it corresponds to a memory space of $2^n$ bytes. In this manner, an area spanning a maximum of $2^{n+3}$ bytes can be allocated in the PCI space. On a processor having a local memory as large as $2^{n+3}$ bytes, if the BAR is set to $2^n$ bytes, then addresses 0 through $2^n-1$ of the local memory can be accessed from the PCI space, but addresses $2^n$ through $2^{n+3}-1$ cannot be accessed from the outside, because they are not allocated to the PCI space. In this way, access control can be accomplished using the BAR.

FIG. 11 illustrates a configuration which allows the contents of a data holding register 354 to be updated from inside the processor. A selector 369, under the control of a selection signal 370, chooses between the output of the data holding register 354 and a BAR set signal 368 specifying a BAR area sent from inside the processor. The output of the selector 369 is input to the data holding register 354 to update its contents. The output 355 of the data holding register 354 is input to a decoder 356, which determines which bits of the BAR are to be updated.

The decoder 356 sends decode result signals 358, 359, 360, and 361 to a group of Logical AND circuits 362, which correspond to the n-th bit 364, n+1-th bit 365, n+2-th bit 366, and n+3-th bit 367 of a BAR 363, respectively. They are ANDed with a BAR change signal 357, and the results are input to the n-th bit 364, n+1-th bit 365, n+2-th bit 366, and n+3-th bit 367 of the BAR 363.

Thus, on a PCI bus interface that is capable of forcing a selected bit of the BAR to a value of logical "0," it is possible to create an asymmetric access environment. Forcing a certain bit of the BAR to a value of logical "0" allows only part of the memory space of a PCI device's entire local memory to be allocated to the memory space on the PCI bus. As a result, while the PCI device having this local memory can access the entire memory space, all other PCI devices can access only that part of the memory space which is mapped onto the memory space on the PCI bus. Such an implementation can also make it possible to update the contents of the BAR, thereby specifying an access-prohibited area.

Figure 12:
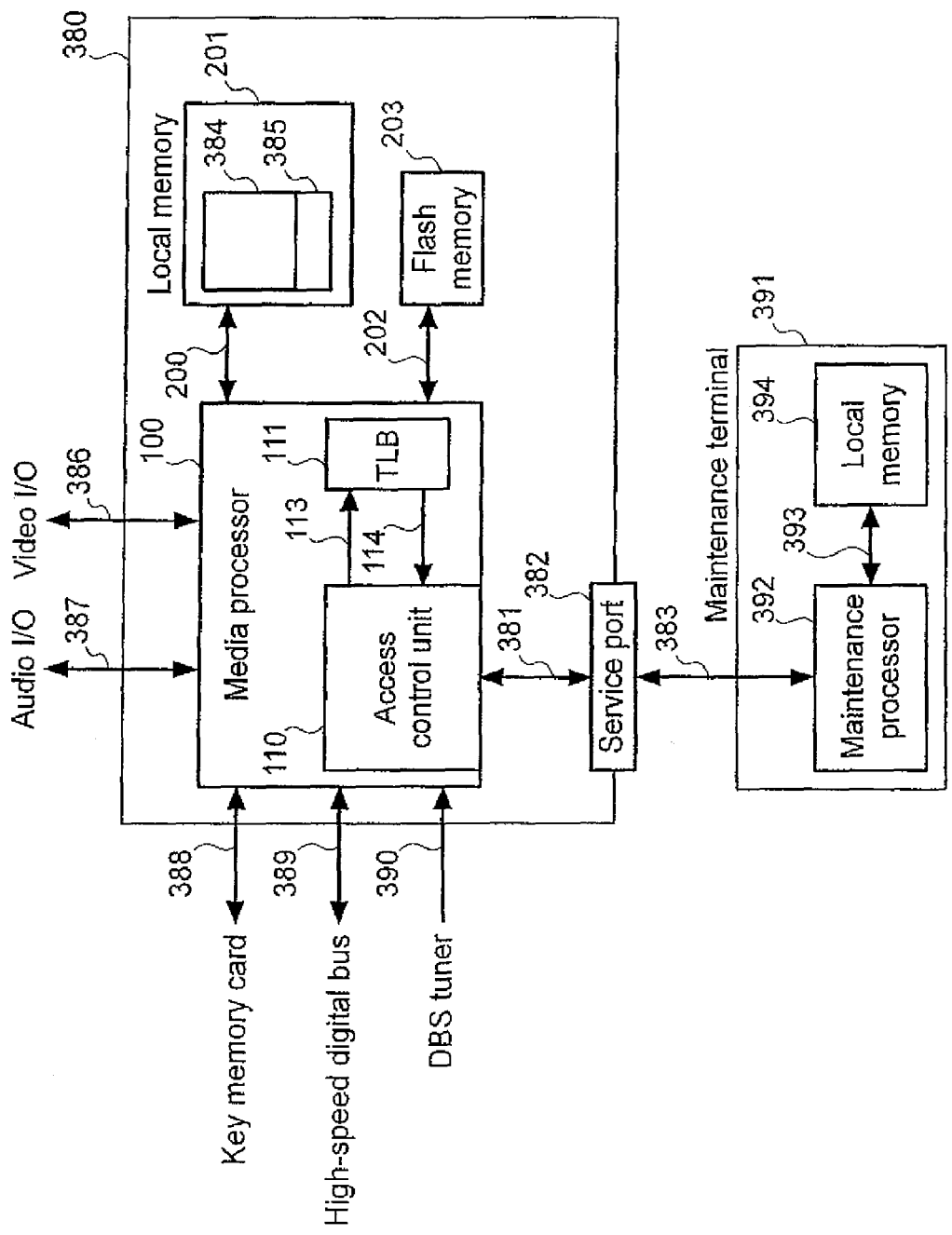
FIG. 12 is a block diagram which shows a configuration in which a media processor equipped with a preferred embodiment of the present invention is used as a set top box (STB).

FIG. 12 illustrates the configuration of a set top box (STB) equipped with a media processor according to the invention.

An STB 380 comprises a media processor 100, a local memory 201, a flash memory 203, and a service port 382. The local memory 201, the flash memory 203, and the service port 382 are connected to the media processor 100 through a local memory bus 200, a flash memory bus 202, and a universal bus 381, respectively. The STB 380 also has various interfaces, including a video input/output (I/O) interface 386, an audio I/O interface 387, a key memory card interface 388 for interfacing with a key memory card that holds keys for decrypting video signals, a high-speed digital bus interface 389 for transferring data to and from external storage devices at high speed, and a transport stream interface 390 for receiving video signals from a digital broadcasting satellite (DBS) tuner.

The service port 382 is provided to connect the media processor 100 to a maintenance terminal 391 for diagnostic and maintenance purposes. A universal interface signal 383 connects the service port 382 to the maintenance terminal 391, which comprises a maintenance processor 392 and a local memory 394. More specifically, the universal interface signal 383 connects the service port 382 to the maintenance processor 392, to which the local memory 394 is connected through a local memory bus 393.

When the maintenance processor 391 is connected, not all of the local memory 201 inside the STB is accessible: Only an access-permitted area 385 of the local memory 201 can be read or written into. An access-prohibited area 384 of the local memory 201 can be accessed only by the media processor 100 contained in the STB 380. During diagnosis and maintenance, communication with the media processor 100 takes place only through the access-permitted area 385.

Therefore, even if a device other than the maintenance terminal 391 is connected, it is possible to protect confidential information kept inside the media processor 100, such as cryptographic keys for decrypting encrypted data and software for operating the media processor 100.

The invention also makes it possible to block illegitimate attempts from the outside to access the media processor's internal memory that contains confidential information, such as cryptographic keys and software. The allowable range of access can be set by the application as necessary. Whereas the foregoing description has shown that access control applies to physical areas, other embodiments of the invention can be envisaged that apply access control to logical areas.

A number of embodiments of the present invention have been described. It should be understood, however, that various modifications may be made without departing from the spirit and scope of the invention, and that the invention is not to be limited by the specific illustrated embodiments, but only by the scope of the appended claims.

The invention makes it possible to block illegitimate access from the outside to, and thereby to protect, confidential information kept inside a processor and the contents of external memories such as a local memory and a flash memory that are connected to a processor.

What is claimed is:

1. An external bus interface method useable within an apparatus including a processor core for performing computation, an external bus interface unit for connecting to an external bus, a memory interface unit for controlling access to a local memory, and an internal bus that interconnects the processor core, the external bus interface unit, and the memory interface unit, the method comprising:
   receiving, via an access control unit, an access request conveyed through the external bus, and
   judging, via an access judging unit connected to the access control unit, whether the access request is to be honored or rejected,
   wherein upon receiving the access request conveyed through the external bus, the access control unit sends to the access judging unit an access judging check request signal asking whether the requested address falls within one of the access-permitted areas registered in the access judging unit,
   the access judging unit checks whether the requested address falls within one of the access-permitted areas registered in it and returns to the access control unit, an access judging check result signal indicating whether the access request is to be honored or rejected,
   and if the access judging check result signal indicates that the access request is to be rejected, the access control unit nullifies the access request.

2. The method of claim 1, comprising:
   updating, via an access judging control unit, contents of the access judging unit as requested by the processor core,
   wherein the access judging control unit can update the range of each of the access-permitted areas according to an access judging change request issued by the processor core.

3. The method of claim 1, wherein the external bus is a PCI bus.

4. The method of claim 1, wherein the external bus is a universal bus.

5. The method of claim 1, wherein the apparatus including a cryptographic arithmetic unit for processing encryption and decryption that is connected to the internal bus, wherein the method comprising the access control unit limiting access to the cryptographic keys and registers for determining the cryptographic algorithm contained in the cryptographic arithmetic unit.

6. The method of claim 1, wherein if the access judging check result signal indicates that the access request is to be honored, the access control unit grants permission to access the local memory through the internal bus and the memory interface unit.

7. A bus interface method useable in an apparatus having an internal bus and connected to an external bus, the method comprising:
   receiving, via an access control unit, an access request sent through the external bus, and
   determining, via an access judging unit connected to the access control unit, whether the access request sent through the external bus is to be honored or rejected,
   wherein the access control unit, upon receiving the access request sent through the external bus, sends to the access judging unit an access judging check request signal asking whether the requested address falls within one of the access-permitted areas registered in the access judging unit,
   the access judging unit checks whether the requested address falls within one of the access-permitted areas registered in it and returns to the access control unit, an access judging check result signal indicating whether the access request is to be honored or rejected, and
   and if the access judging check result signal indicates that the access request is to be rejected, the access control unit nullifies the access request.

8. The method of claim 7, wherein the apparatus including a decoder for converting an address specified by the access request sent through the external bus into an address to be used on the internal bus,
   wherein the method comprising the access control unit sending an access request to the internal bus using the address generated as a result of the conversion by the decoder.

9. An external bus interface method useable within an apparatus including a processor core for performing computation, an external bus interface unit for connecting to an external bus, a memory interface unit for controlling access to a local memory, and an internal bus that interconnects the processor core, the external bus interface unit, and the memory interface unit, the method comprising:
   receiving, via an access control unit, an write request conveyed through the external bus, and
   judging, via an access judging unit connected to the access control unit, whether the write request is to be honored or rejected,
   wherein upon receiving the write request conveyed through the external bus, the access control unit sends to the access judging unit an access judging check request signal asking whether the requested address falls within one of the access-permitted areas registered in the access judging unit,
   the access judging unit checks whether the requested address falls within one of the access-permitted areas registered in it and returns to the access control unit, an access judging check result signal indicating whether the write request is to be honored or rejected,
   and if the access judging check result signal indicates that the write request is to be rejected, the access control unit nullifies the write request.

10. The method of claim 9, comprising:
    updating, via an access judging control unit, contents of the access judging unit as requested by the processor core, wherein the access judging control unit can update the range of each of the access-permitted areas according to an access judging change request issued by the processor core.

11. The method of claim 9, wherein the external bus is a PCI bus.

12. The method of claim 9, wherein the external bus is a universal bus.

13. The method of claim 9, wherein the apparatus including a cryptographic arithmetic unit for processing encryption and decryption that is connected to the internal bus, wherein the method comprising the access control unit limiting access to the cryptographic keys and registers for determining the cryptographic algorithm contained in the cryptographic arithmetic unit.

14. The method of claim 9, wherein if the access judging check result signal indicates that the write request is to be honored, the access control unit grants permission to access the local memory through the internal bus and the memory interface unit.

* * * * *